US012668070B2

(12) United States Patent
Maezawa

(10) Patent No.: US 12,668,070 B2
(45) **Date of Patent: *Jun. 30, 2026**

(54) IMAGE FORMING APPARATUS

(71) Applicant: KYOCERA Document Solutions Inc., Osaka (JP)

(72) Inventor: Nobuhiro Maezawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 239 days.

This patent is subject to a terminal disclaimer.

(21) Appl. No.: 18/764,132

(22) Filed: Jul. 3, 2024

(65) Prior Publication Data

US 2025/0010613 A1 Jan. 9, 2025

(30) Foreign Application Priority Data

Jul. 6, 2023 (JP) ................................ 2023-111281

(51) Int. Cl.

| | |
|---|---|
| ***B41J 11/00*** | (2006.01) |
| ***B41J 2/145*** | (2006.01) |
| *B41J 3/407* | (2006.01) |

(52) U.S. Cl.
CPC .......... *B41J 11/0015* (2013.01); *B41J 2/145* (2013.01); *B41J 3/407* (2013.01)

(58) Field of Classification Search
CPC ......... B41J 11/0015; B41J 2/145; B41J 3/407
See application file for complete search history.

(56) References Cited

U.S. PATENT DOCUMENTS

2014/0253651 A1 9/2014 Akiyama et al.
2017/0297347 A1* 10/2017 Torisaka .............. B41J 11/0015

FOREIGN PATENT DOCUMENTS

CN 1934203 A * 3/2007 ............ C09D 11/54
JP 2014172218 A 9/2014

* cited by examiner

*Primary Examiner* — Justin Seo
(74) *Attorney, Agent, or Firm* — Studebaker Brackett PLLC

(57) ABSTRACT

An image forming apparatus includes an ink head unit, a precoating head unit, and a control part. The ink head unit ejects ink to a printing base material conveyed along a predetermined conveying direction. The precoating liquid head unit is disposed on an upstream side of the ink head unit in the conveying direction and ejects precoating liquid to the printing base material. The control part controls the precoating liquid head unit so as to eject the precoating liquid. When a surface tension of the recording base material is smaller than a predetermined value, the control part controls the precoating liquid head unit to eject a predetermined amount of the precoating liquid.

5 Claims, 5 Drawing Sheets

FIG. 4

| | SURFACE TENSION (mN/m) | APPLICATION AMONT (g/m²) | LINE WIDTH REPRODUCIBILITY | DRYING STATE |
|---|---|---|---|---|
| Example 1 | 22.6 | 2.0 | ○ | ○ |
| Example 2 | 22.6 | 1.5 | ○ | ○ |
| Example 3 | 22.6 | 1.0 | ○ | ○ |
| Example 4 | 22.6 | 3.0 | ○ | ○ |
| Example 5 | 34.0 | 2.0 | ○ | ○ |
| Example 6 | 38.0 | 2.0 | ○ | ○ |
| Comparative Example 1 | 22.6 | 0.5 | △ | ○ |
| Comparative Example 2 | 22.6 | 0.0 | × | ○ |
| Comparative Example 3 | 22.6 | 3.5 | ○ | × |

IMAGE FORMING APPARATUS

INCORPORATION BY REFERENCE

This application is based on and claims the benefit of priority from Japanese patent application No. 2023-111281 filed on Jul. 6, 2023, which is incorporated by reference in its entirety.

BACKGROUND

The present disclosure relates to an image forming apparatus which forms an image on a printing base material by an inkjet method.

In an inkjet type image forming apparatus, in order to enhance adhesiveness between the printing base material and ink, a precoating treatment in which a precoating liquid is applied to the printing base material is generally performed.

An amount of the applied precoating liquid may be determined based on a type of the ink and an adhesion amount of the ink per unit area. This improves an abrasion resistance of the printing base material on which the image is formed.

The adhesiveness between the printing base material and the ink is considered to depend on the characteristics of the printing base material in addition to a type of the ink and an adhesion amount of the ink per unit area.

SUMMARY

An image forming apparatus according to the present disclosure includes an ink head unit, a precoating head unit, and a control part. The ink head unit ejects ink to a printing base material conveyed along a predetermined conveying direction. The precoating liquid head unit is disposed on an upstream side of the ink head unit in the conveying direction and ejects precoating liquid to the printing base material. The control part controls the precoating liquid head unit so as to eject the precoating liquid. When a surface tension of the printing base material is smaller than a predetermined value, the control part controls the precoating liquid head unit to eject a predetermined amount of the precoating liquid.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 4 is a table showing a result of test evaluating line width reproducibility and drying state of ink, in the image forming apparatus according to the embodiment of the present disclosure.

DETAILED DESCRIPTION

Hereinafter, an image forming apparatus according to one embodiment of the present disclosure will be described with reference to the drawings.

Figure 1:
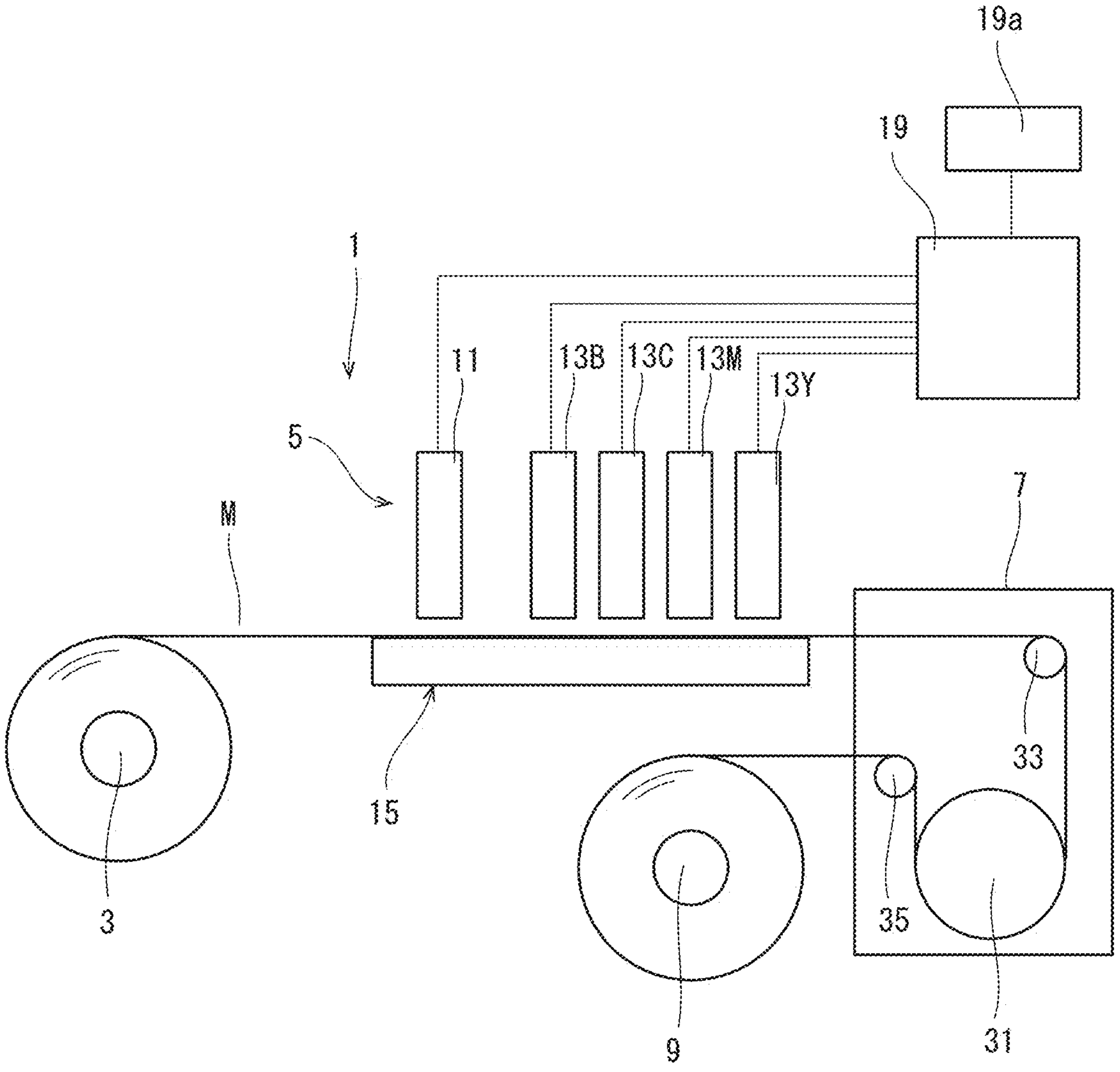
FIG. 1 is a front view schematically showing an image forming apparatus according to one embodiment of the present disclosure.

With reference to FIG. 1, the entire structure of the image forming apparatus 1 will be described. FIG. 1 is a front view schematically showing an internal structure of the image forming apparatus 1.

The image forming apparatus 1 includes a feed roller 3 around which a long printing base material M is wound, an image forming part 5 which forms an image on the printing base material M fed from the feed roller 3, in an inkjet method, a drying part 7 which dries the image formed by the image forming part 5, and a rewinding roller 9 which winds the printing base material M dried by the drying part 7.

The printing base material M is wound and mounted on the feed roller 3. By rotating the feed roller 3, the printing base material M is fed out in a predetermined conveying direction.

The image forming part 5 is disposed on the downstream side of the feed roller 3 in the conveying direction. The image forming part 5 includes one precoating liquid head unit 11, four ink head units 13B, 13C, 13M, and 13Y (collectively referred to as the ink head unit 13), and a conveying plate 15 on which the printing base material M is conveyed.

The precoating liquid head unit 11 is disposed on the upstream side of the ink head units 13 in the conveying direction. The precoating liquid head unit 11 and the ink head units 13 have the same structure. The head units 11, 13 are electrically connected to a control part 19.

Figure 2:
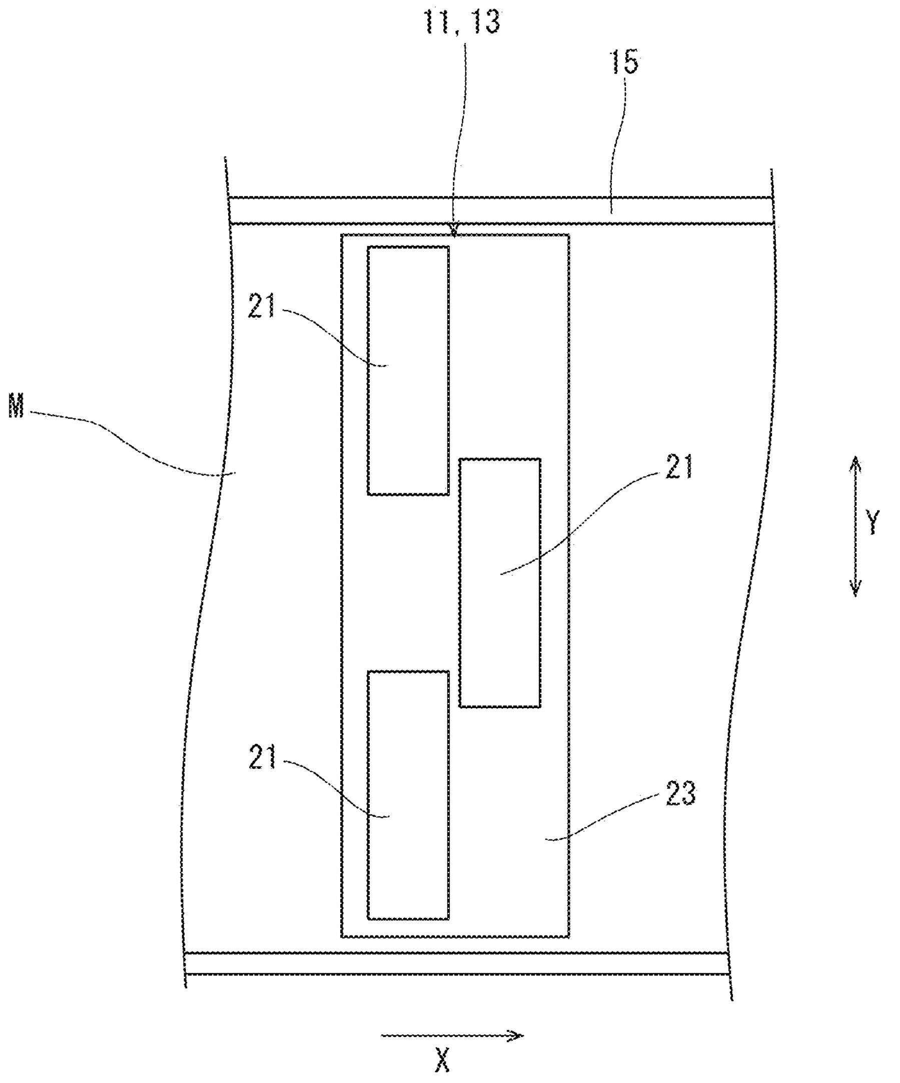
FIG. 2 is a plan view showing a head unit, in the image forming apparatus according to the embodiment of the present disclosure.

As shown in FIG. 2, the precoating liquid head unit 11 and the ink head units 13 each include three print heads 21 and a plate 23 for supporting the three print heads 21. FIG. 2 is a plan view showing the head units 11, 13.

As shown in FIG. 2, the three print heads 21 are arranged in a staggered shape along the width direction Y (a direction intersecting the conveying direction X) so as to have the same width as the width of the printing base material M (a length along the width direction Y) (a line head system), and are supported by the plate 23. Each print head 21 includes a number of nozzles (not shown). The ejection ports of the nozzles are opened to the lower surface of the print head 21.

The precoating liquid is supplied to each print head 21 of the precoating liquid head unit 11. The supplied precoating liquid is ejected downward from the ejection port of each print head 21. The components of the precoating liquid are, for example, 10% polyester resin (Trade name, PESRESIN A-640, manufactured by TAKAMATSU OIL&HAT CO., LTD.), 0.04% surfactant (Trade name, Surfynol 440, manufactured by Nisshin Chemical co., ltd.), 25% propylene glycol, and 64.96% water.

The four ink head units 13B, 13C, 13M, and 13Y are arranged in order along the conveying direction X, and black, cyan, magenta, and yellow inks are supplied, respectively. The supplied ink is ejected downward from the ejection ports of each print head 21.

With reference to FIG. 1 again, the conveying plate 15 is disposed below the precoating liquid head unit 11 and the ink head units 13. The upper surface of the conveying plate 15 is formed flat. As shown in FIG. 2, the width of the conveying plate 15 is wider than the width of the printing base material M and all the head units 11 and 13. Below the conveying plate 15, a heat source (not shown) is disposed to heat the conveying plate 15 to a predetermined temperature. The conveying plate 15 is made of, for example, metal.

The printing base material M fed from the feed roller 3 is conveyed below the precoating liquid head unit 11 and the ink head units 13 along the upper surface of the conveying plate 15.

The drying part 7 is disposed on the downstream side of the image forming part 5 in the conveying direction. The drying part 7 includes a heat drum 31 and upstream and downstream tension rollers 33, 35 disposed on the upstream side and the downstream side of the heat drum 51. The printing base material M passed through the image forming part 5 is wound around the heat drum 31 between the upstream and downstream tension rollers 33, 35. The heat drum 31 is heated to dry the printing base material M conveyed along its surface.

The rewinding roller 9 is disposed on the downstream side of the drying part 7 in the conveying direction. One end of the printing base material M is fixed to the rewinding roller 9. The rewinding roller 9 is connected to a motor (not shown) and rotated. By rotating the rewinding roller 9 in a predetermined direction at a predetermined rotational speed by the motor, the printing base material M is fed from the feed roller 3. The fed printing base material M passes through the image forming part 5 and the drying part 7, and is wound by the rewinding roller 9.

As described above, the control part 19 controls the head unit 13. Further, the control part 19 is provided with an input unit **19*a* such as a display panel. The input unit 19*a*** includes a surface tension input unit for inputting a value of surface tension of the printing base material M. The value of surface tension is, for example, a value measured in accordance with "JIS K 6768:1999 Plastic-Film and Sheet-Wetting Tension Test Method".

The image forming operation of the image forming apparatus 1 having the above configuration will be described. In the image forming operation, first, the user inputs a surface tension of the printing base material M to the input unit **19*a* of the control part 19. When a value of the input surface tension is less than 38 mN/m, the control part 19 controls the precoating liquid head unit 11** so as to eject a predetermined amount (for example, 2.0 g/m$^2$) of the precoating liquid.

Thereafter, the motor is driven to rotate the rewinding roller 9, and the printing base material M is fed from the feed roller 3 to the image forming part 5. In the image forming part 5, the printing base material M is conveyed along the upper surface of the conveying plate 15. When the printing base material M is conveyed below the precoating liquid head unit 11, the control part 19 controls the precoating liquid head unit 11 to eject the predetermined amount of the precoating liquid to the printing base material M based on the image data. On the other hand, when the value of the input surface tension is equal to or higher than 38 mN/m, the control part 19 controls the precoating liquid head unit 11 so as not to eject the precoating liquid. That is, if the input surface tension value is equal to or higher than 38 mN/m or more, the precoating treatment is not performed.

Thereafter, the printing base material M is conveyed below the ink head units 13, and the ink of a predetermined color is ejected from the corresponding head unit 13 based on the image data. At this time, the printing base material M is auxiliary dried by the heated conveying plate 15. The ink reacts with the precoating liquid, making it difficult to move from the landing position. The printing base material M on which the image is thus formed is conveyed to the drying part 7. The ink is completely dried in the drying part 7. Thereafter, the printing base material M is wound around the rewinding roller 9.

Figure 3:
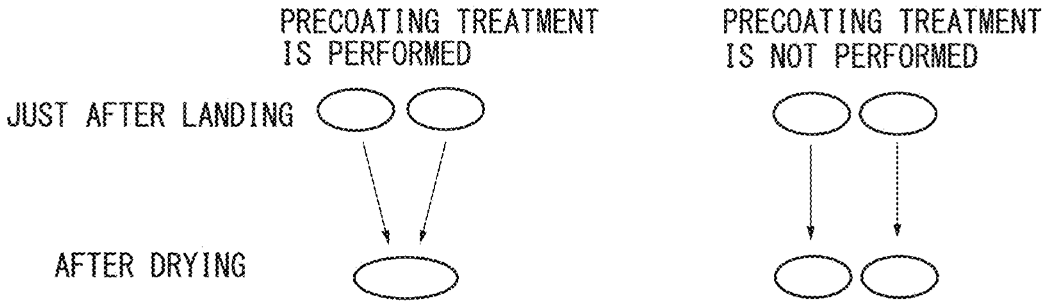
FIG. 3 is a diagram explaining a behavior of liquid droplet with respect to a printing base material having different surface tension, in the image forming apparatus according to the embodiment of the present disclosure.

As described above, according to the present disclosure, the precoating treatment is performed only when the surface tension of the printing base material M is less than 38 mN/m. When the surface tension of the printing base material M is low as described above, the surface energy of the printing base material M is low and stable, so that the landed ink droplet can easily move from the landing position on the printing base material M. As a result, the two ink droplets may be attracted, resulting in a single large droplet after drying, as shown in the left diagram of FIG. 3. Then, the size of the droplet becomes non-uniform, and as a result, the line width becomes non-uniform. On the other hand, when the precoating treatment is performed, the adhesiveness between the ink and the printing base material M increases, and the landed ink droplet hardly moves from the landing position on the printing base material M. As a result, as shown in the right diagram of FIG. 3, the two ink droplets are fit in the printing base material M, and are not attracted to each other. When the surface tension of the printing base material M is high (for example, 38 mN/m or more), the surface energy of the printing base material M is high and unstable, so that other objects (such as the ink) are easily adhered to the surface. That is, the ink is easily fitted in the printing base material M.

Therefore, only when the surface tension of the printing base material M is less than 38 mN/m, the precoating treatment can be performed to enhance the adhesiveness between the printing base material M and the ink, and the precoating treatment can be efficiently performed. The printing bae material having a surface tension of less than 38 mN/m is, for example, a plastic film made of PET or polypropylene.

Next, a test in which a relationship between a surface tension of the printing base material, a line width reproducibility and a drying state is evaluated in the image forming apparatus 1 of this embodiment will be described. As the precoating liquid, one containing the above components (10% polyester resin (Trade name, PESRESIN A-640, manufactured by TAKAMATSU OIL&HAT CO., LTD.), 0.04% surfactant (Trade name, Surfynol 440, manufactured by Nisshin Chemical co., ltd.), 25% propylene glycol, and 64.96% water) is used.

The surface tension of the printing base material to be tested is measured in accordance with "JIS K 6768:1999 Plastic-Film and Sheet-Wetting Tension Test Method". The printing base materials having different surface tensions are prepared, and the precoating treatment is performed by changing the application amount of the precoating liquid. The results of evaluating the line width reproducibility and the drying state of the one dot line image printed using the cyan ink at 600 dpi on each printing base material is shown in the table of FIG. 4.

The line width reproducibility is determined from an observation result using a microscope (Trade name, MM-800 (manufactured by Nikon Corporation)). A case where the line width is less than 45 μm is defined as ○, a case where the line width is 45 μm or more and less than 50 μm is defined as Δ, and a case where the line width is 50 μm or more is defined as x. As for the drying state, hot air with a temperature of 120° C. and a wind speed of 37 m/s is applied to the printing base material for 10 seconds, and thereafter, the image is touched with the finger. A case where the ink does not adhere to the finger is defined as ○, and a case where the ink adheres to the finger is defined as X.

Figure 5A:
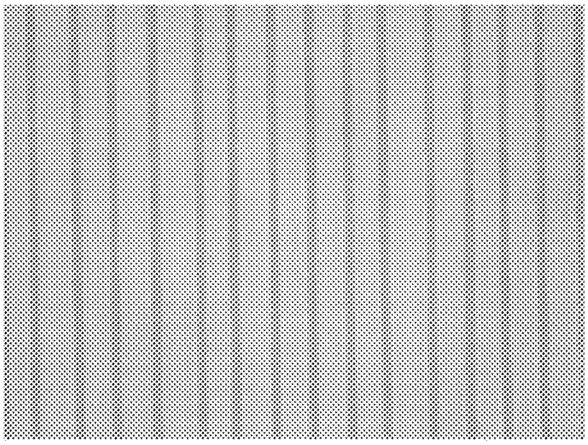
FIG. 5A is a diagram (photograph) showing an image in Present Example 1, in the image forming apparatus according to the embodiment of the present disclosure.
Figure 5B:
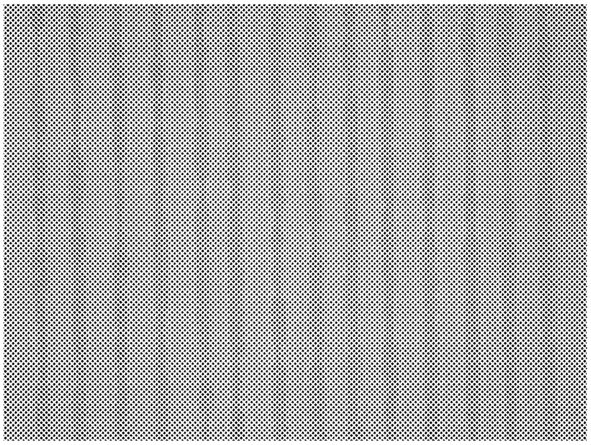
FIG. 5B is a diagram (photograph) showing an image in Comparative Example 1, in the image forming apparatus according to the embodiment of the present disclosure.

In Present Examples 1 to 5, the surface tension value is changed from 22.6 to 38.0 mN/m, and the precoating treatment is performed by changing the application amount of the precoating liquid. In Comparative Examples 1 to 3, the surface tension value is 22.6 mN/m, and the application amount of the precoating liquid is reduced compared with Present Examples (Comparative Example 1), is increased compared with Present Examples (Comparative Example 3), and the precoating treatment is preformed (Comparative Example 2). The images of Present Example 1 and Comparative Example 2 are shown in FIG. 5A and FIG. 5B, respectively.

From the table shown in FIG. 4, in Present Examples 1 to 5, when the value of the surface tension is 22.6 to 38.0 mN/m, by performing the precoating treatment in the range of the application amount of 1.0 to 3.0 $g/m^2$, good results are obtained in both the line width reproducibility and the drying state. As shown in FIG. 5A, the width of the lines is uniform.

On the other hand, in Comparative Example 1, although the value of surface tension is the same as that in Present Examples 1 to 4, the application amount is smaller than that in Present Examples 1 to 4. Therefore, it is considered that the effect of the precoating treatment is not sufficiently exhibited and the good line width reproducibility cannot be obtained. Further, in Comparative Example 2, although the value of the surface tension is the same as that in Present Examples 1 to 4, since the precoating treatment is not performed, the landed ink droplets are attracted and the line width becomes wide, and the good line width reproducibility is not obtained. As shown in FIG. 5B, the line width is uneven compared to FIG. 5A. In Comparative Example 3, although the value of surface tension is the same as that of Present Examples 1 to 4, the application amount is larger than that of Present Examples 1 to 4. Therefore, it is considered that the application amount of the precoating liquid is excessive and the good drying state cannot be obtained.

From this evaluation results, it is confirmed that when the value of surface tension is less than 38.0 mN/m, the good line width reproducibility and the drying state can be obtained by performing the precoating treatment.

In the above embodiment, the four ink head units 13 are used, but the present disclosure is not limited to the four colors, and may be more or less than the four colors. The head units 11, 13 are not limited to the line head system. However, the line head system is preferable because the printing speed can be increased. A long plastic film (PET film) is used as the printing base material M, but a cut film may be used. The printing base material M may be a synthetic paper or the like.

Although the present disclosure has been described in particular embodiments, the present disclosure is not limited to the foregoing embodiments. A person skilled in the art may modify the above embodiments so long as they do not deviate from the scope and object of the present disclosure.

The invention claimed is:

1. An image forming apparatus comprising:

an ink head unit which ejects ink to a printing base material conveyed along a predetermined conveying direction;

a precoating liquid head unit which is disposed on an upstream side of the ink head unit in the conveying direction and ejects precoating liquid to the printing base material; and a control part which controls the precoating liquid head unit so as to eject the precoating liquid, wherein when a surface tension of the printing base material is smaller than a predetermined value, the control part controls the precoating liquid head unit to eject a predetermined amount of the precoating liquid; and when the surface tension of the printing base material is not smaller than the predetermined value, the control part controls the precoating liquid head unit to not eject the precoating liquid.

2. The inkjet recording apparatus according to claim 1, wherein the control part includes an input unit to which the surface tension of the printing base material is input.

3. The inkjet recording apparatus according to claim 1, wherein the control part controls the precoating liquid head unit to eject a predetermined amount of the precoating liquid when a surface tension of the printing base material is less than 38 mN/m.

4. The image forming apparatus according to claim 1, wherein the printing base material is a plastic film.

5. The image forming apparatus according to claim 1, wherein the precoating liquid head unit and the ink head unit have a same configuration.

* * * * *